Aug. 26, 1930.  P. E. CLOUD  1,774,356
WINDSHIELD WIPER
Filed Jan. 4, 1929
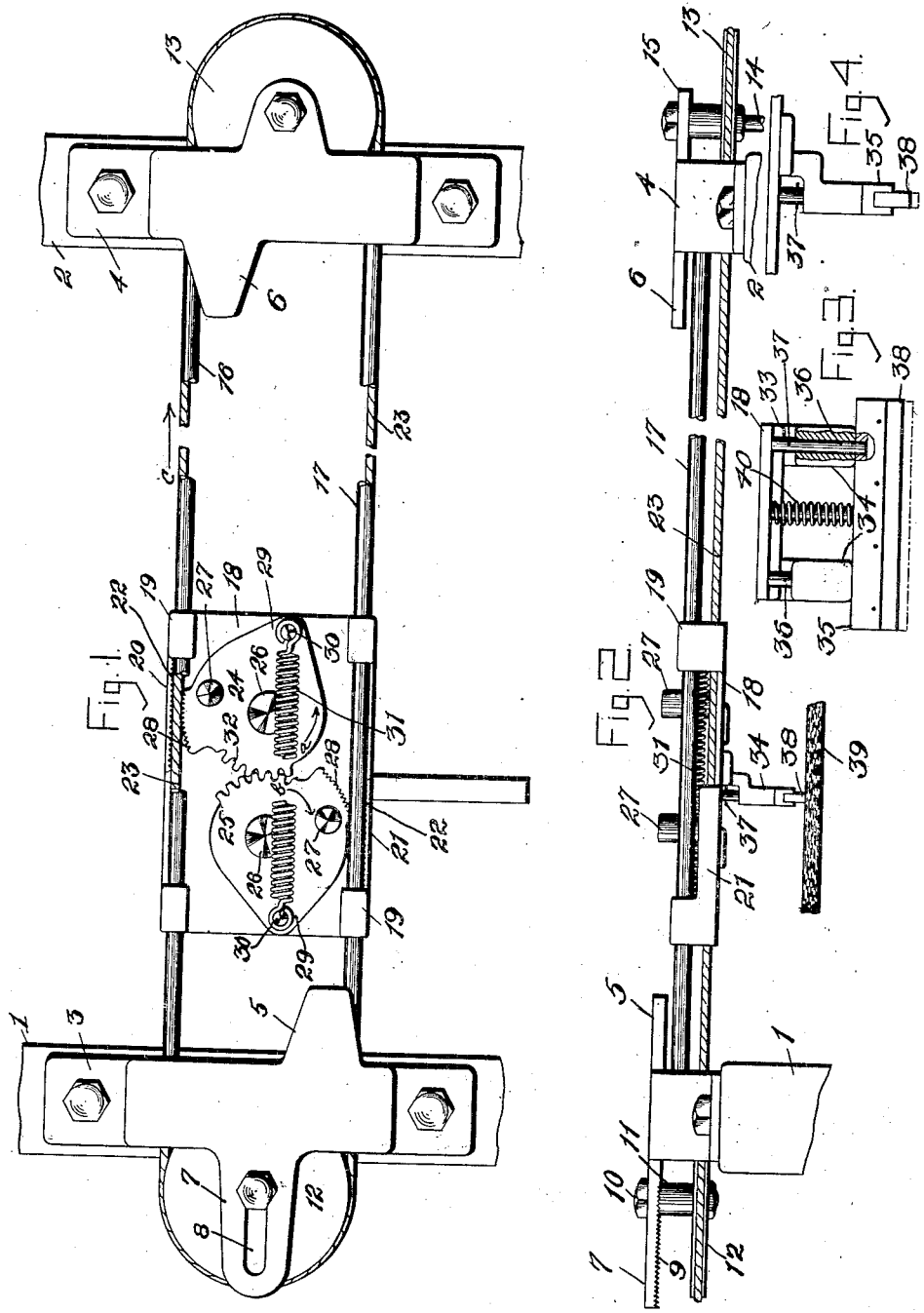
INVENTOR:
Preston E. Cloud
BY
J. E. Hutchinson Jr.
ATTORNEYS.

Patented Aug. 26, 1930

1,774,356

UNITED STATES PATENT OFFICE

PRESTON E. CLOUD, OF WAYNESBORO, PENNSYLVANIA

WINDSHIELD WIPER

Application filed January 4, 1929. Serial No. 330,305.

This invention relates to windshield wipers or cleaners and more particularly to that type which are constructed and arranged to reciprocate either substantially across the entire windshield or throughout a given portion thereof, and has for its principal object novel mechanism for converting continuous rotary motion into reciprocating motion without any substantial or material interruption at the end of each stroke.

Another and a very important object of the invention is the construction of a device of this character in which the parts are so designed that they can either be obtained as stock parts or constructed by simple punch press operations so that the expense of producing a device of this kind is materially reduced thus enabling the manufacturer to put the article upon the market at a comparatively nominal figure.

Still another object of the invention is the provision of a construction which enables the device to be placed upon automotive vehicles or other conveyances with wide variations in the width of the windshield or other closure member to be cleaned.

A still further object of the invention is the provision of a device of this kind which may be driven from any suitable source of power such as a small electric motor, vacuum or hydraulic motors or by hand when desired and is so constructed that the movement of the wiping element may have its movement varied so far as distance travelled is concerned, to suit conditions, and in the case of a motor vehicle may be caused to wipe entirely or substantially entirely across the windshield or may be arranged to clean only a portion thereof, for instance in front of the driver. If desirable two wiping elements may be connected to the carrier member so that one wiper will operate across a portion of the glass to be cleaned and the other will wipe the remainder of the glass.

Further objects of the invention will appear as the following specific description is read in connection with the accompanying drawing which forms a part of this application, and in which Fig. 1 is a front elevation of the device shown mounted on the windshield frame of an automotive vehicle;

Fig. 2 is a bottom plan view thereof;

Fig. 3 is a detailed elevation of the wiper support partly in section, and

Fig. 4 is a bottom plan view of the wiper support somewhat enlarged.

Referring more particularly to the drawings, 1 and 2 represent the stanchions or side pieces of the windshield frame of an ordinary motor vehicle. The device which is attached thereto comprises the mounting brackets 3 and 4 which are substantially yoke-shaped and each carry projections or throwing lugs, the one on the left bracket being indicated at 5 and that on the right bracket being indicated at 6. The bracket 3 carries a suitable mounting extension 7 provided with a longitudinal slot 8 and having the inner face thereof serrated as indicated at 9 so that a supporting stud shaft 10 may be adjustably mounted upon said extension. This stud shaft has arranged thereon a spacing sleeve 11 which holds the idler pulley 12 spaced a sufficient distance on the shaft 10 from the extension 7. This idler pulley corresponds in all respects to the drive pulley 13 mounted upon a drive shaft 14 journalled in an ear 15 upon the bracket 4.

Between these brackets and arranged in parallelism are a pair of guide rods 16 and 17 which support a carrier member 18. This carrier member is preferably made of sheet metal with bearing lugs or ears 19 stamped up from each corner and arranged to partially surround the guide rods 16 and 17 which are secured to the brackets 3 and 4 in any preferred manner.

Forming an extension of the ears 19 at angularly opposite corners are bearing strips 20 and 21 each provided with a serrated under-surface 22 arranged to be engaged by the drive cable 23 which travels over the pulleys 12 and 13. The upper stretch of the cable as will be readily seen is arranged to engage the serrated surface on the under side of the bearing strip 20, while the lower stretch of this cable is arranged to engage the serrated surface of the lower bearing strip 21.

In order to cause the alternate engagement of the different stretches of the cable with the serrated surfaces of the bearing strips 20 and 21, I provide a pair of gripping members 24 and 25 each of which is pivoted upon the carrier plate by the pivot studs 26 and each of which carry the tripping studs 27. These gripping members are each provided with a serrated gripping surface 28 which is somewhat off-center and which is adapted to coact when thrown into operative position with the serrated gripping surface of the bearing strips 20 or 21 so as to grip the cable between these two serrated surfaces and thus cause the carrier plate to travel in the direction of the stretch of the cable to which said carrier plate is then secured.

Each gripping member is provided with an extension 29 having secured thereto a laterally extending lug 30 and to these lugs are connected the terminals of a contractile spring 31. The gripping members are also provided with interengaging gear segments 32 which are constantly in mesh as shown in Fig. 1 and which serve to produce a movement of one gripping member in one direction when the other gripping member is moved in the opposite direction. Thus it will be seen that when for instance member 24 is gripping the cable and contacts with the stop 6 it will be moved in a direction of the arrow a, while the member 25 will be moved in a contrary direction or in the direction of the arrow b. As soon as the members start moving the tension on the spring 31 will be increased and when the same passes the centers of the studs 26 its contractile force will cause the serrated surface of the member 24 to be snapped out of engagement with the upper strand of the cable and the serrated surface of the member 25 to be snapped into engagement with the lower stretch of the cable. With the cable travelling continuously in the direction of the arrow c the carrier plate will be given a reciprocating motion the rapidity of which of course will be determined by the speed of the driving shaft 14.

Secured to the inner face of the carrier plate 18 in any suitable manner such for instance as spot welding, brazing, or the like, is a bracket-supporting plate 33 carrying adjacent opposite ends the angular supporting arms 34 upon which the wiper-supporting bar 35 is carried. This supporting bar carries a pair of rods 36 which extend freely through openings in the arms 34 and have retaining pins 37 carried thereby to prevent displacement of the wiper bar in shipment.

In order that the wiper bar 35 with its wiper 38 may be normally forced toward the windshield glass 39, I provide a compression spring 40 which is interposed between the carrier plate and the bar 35 and normally acts to move said bar 35 away from the ends of the arms 34. This spring is, of course, a relatively light one and only tends to exert sufficient pressure on the bar 35 to keep the wiper firmly in engagement with the windshield glass.

In the operation of the device we will assume that the gripping member 24 is in the position shown in Fig. 1, that is, with its serrated surface clamping the upper strand of the cable against the bearing strip 20. In this position and with the shaft 14 continuously rotating, the carrier plate will be moved toward the right and will continue to so move until the stud 27 is brought into engagement with the stop 6 at which time the gripping member 24 will be turned on its axis 26 in the direction of the arrow a and being geared to the gripping member 25 will turn this member in the direction of the arrow b. When the studs 30 have travelled past center the spring 31 will act rapidly to completely withdraw the serrated surface of the member 24 from the upper stretch of the cable and will snap the serrated surface of the member 25 into engagement with the lower stretch of the cable. The plate will then start to move in the direction of movement of the lower stretch of the cable and will continue to so move until the stud 27 on the gripping member 25 comes into engagement with the stop 5 at which time the operation will be reversed and the parts again placed in the position shown in Fig. 1.

If the cable becomes loosened for any reason it will be readily seen that by loosening the nut on the shaft 10 this shaft can be adjusted within the slot 8 and the tension of the cable restored to its original condition.

It will also be seen from an inspection of the drawing that the stops 5 and 6 may be of any desired length so as to regulate the amount of travel of the wiper or one stop may be relatively long and the other stop relatively short so as to wipe a particular portion of the windshield or other glass to be cleaned.

All of the parts of the present construction are of such character and material that they may be purchased on the market or constructed by punch press operations which enables me to place this device on the market at a minimum cost. For instance, the brackets 3 and 4, plate 18, gripping members 24 and 25, wiper bars and cooperating supports are all preferably formed of sheet metal and stamped into their respective forms. Studs and bolts are all of stock material and the guiding rods are made of cold drawn steel which may be purchased on the open market. I also wish it understood that the cable may be of any suitable material having sufficient flexibility to travel around the driving and idler pulleys and whether it is of metal or fiber or a combination of both, its replacement when worn is only a matter of moments and done at a minimum cost. The wiper bar also may be conveniently replaced by removing the stop pins 37 and pulling the rods 36 out of the arms 34.

While I have shown the brackets 3 and 4 as being attached to the uprights of the windshield frame by bolts, it is to be understood that these members may be secured to the frame of the windshield in any suitable way and either to the uprights or to the frame above the windshield beneath the visor in which latter event the supporting plate 33 would of necessity be somewhat lengthened in order to bring the wiper in position to travel across the line of vision of the occupants of the vehicle.

It will, of course, be understood that while the present device has been described in connection with the windshield of an automotive vehicle, the same may be readily employed for cab windows of locomotives, vestibule windows of street cars, or for wiping surfaces in any location and may be utilized for scrubbing surfaces by the use of an abrasive wiper in place of the customary wiper used on windshields.

What I claim is:

1. In a device of the class described, a guiding member, a supporting member arranged to travel thereon, a cable adapted to be continuously driven in one direction, intergeared members for gripping opposite stretches of said cable to the supporting member, means for tripping one of said gripping members out of gripping engagement with said cable and moving the other gripping member toward the other stretch of the cable, and means automatically acting to hold either of said gripping members in gripping position and the other member out of gripping position together with a work element carried by said supporting plate.

2. In a device of the class described, a guiding member, a supporting member slidably mounted thereon, a cable adapted to be driven continuously in one direction, cable gripping members pivoted upon said supporting member and being intergeared with one another, a spring connecting said members and arranged to hold one of them in gripping relation with one stretch of the cable, and means for tripping one of said members and causing a movement of both members in opposite directions, said spring acting when either of the members is tripped beyond center to hold one of the members in gripping relation with one stretch of the cable and the other member disengaged from the opposite stretch, together with a work element carried by said supporting plate.

3. In a device of the class described, supporting brackets, a pair of parallel guiding members carried by said brackets, a supporting plate slidably mounted upon said guiding members, a cable adapted to be continuously driven in one direction and having two stretches arranged parallel to said guiding members, cable gripping dogs pivoted upon said supporting member, coacting means on the brackets and dogs for alternately tripping both of said dogs into and out of engagement with opposite stretches of the cable, a spring connecting said dogs and arranged to hold one dog in engagement with one stretch of the cable and the opposite dog disengaged from the other stretch of the cable, said dogs being intergeared to produce simultaneous movement in opposite directions, together with a work element carried by said supporting plate.

In testimony whereof I affix my signature.

PRESTON E. CLOUD.